Sept. 25, 1962
L. E. AUSTIN
3,055,481
CONVEYOR MECHANISM
Filed Dec. 30, 1957
3 Sheets-Sheet 1
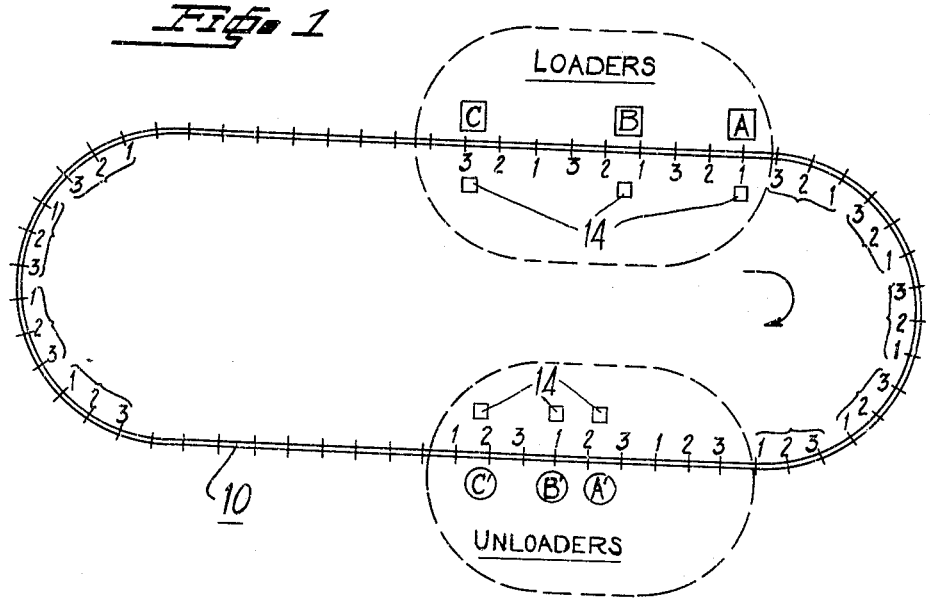
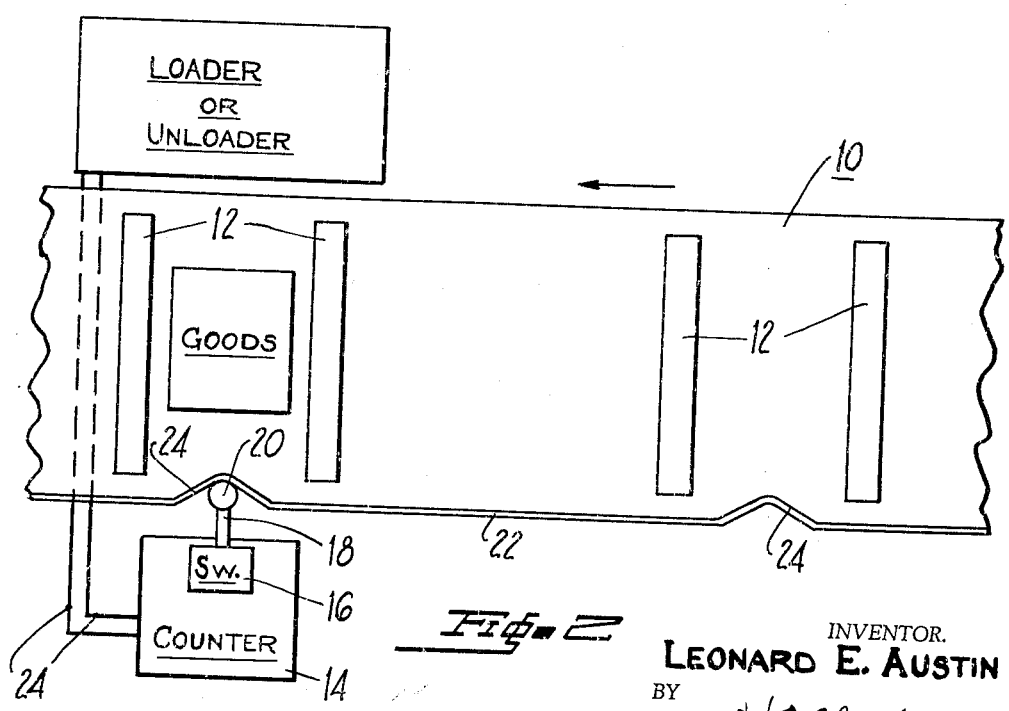
INVENTOR.
LEONARD E. AUSTIN
BY
H. O. Clayton
ATTORNEY

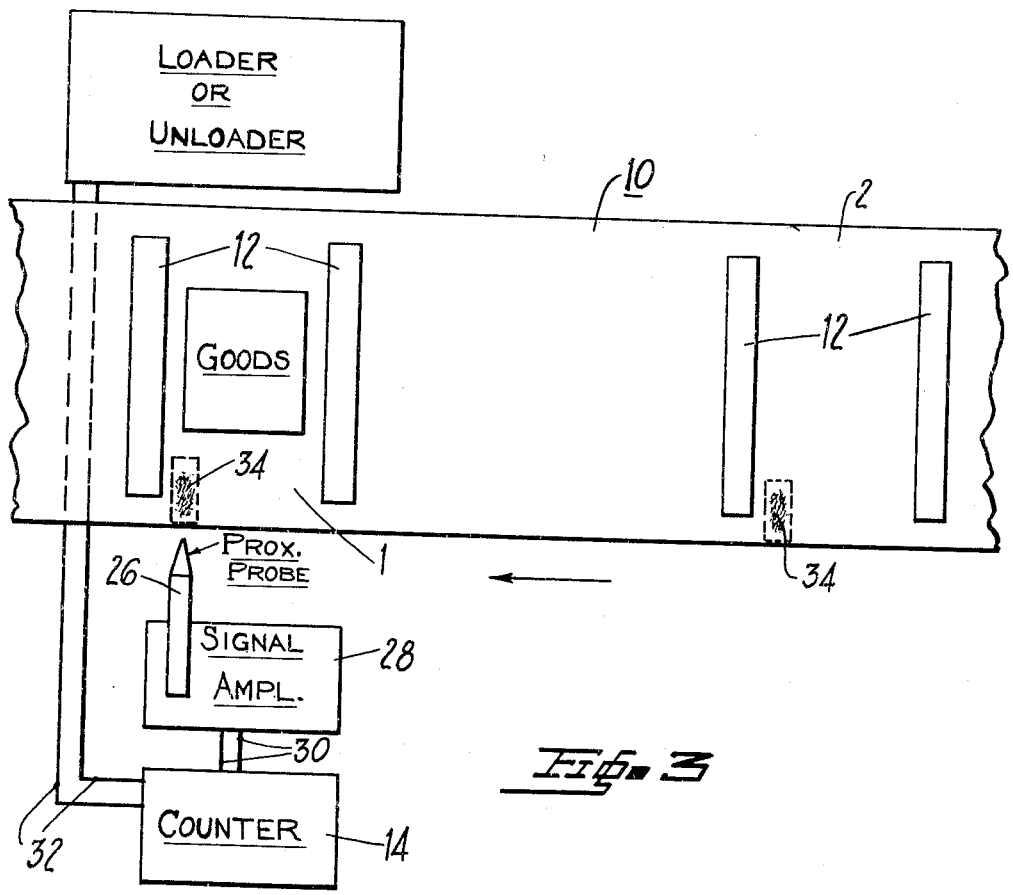

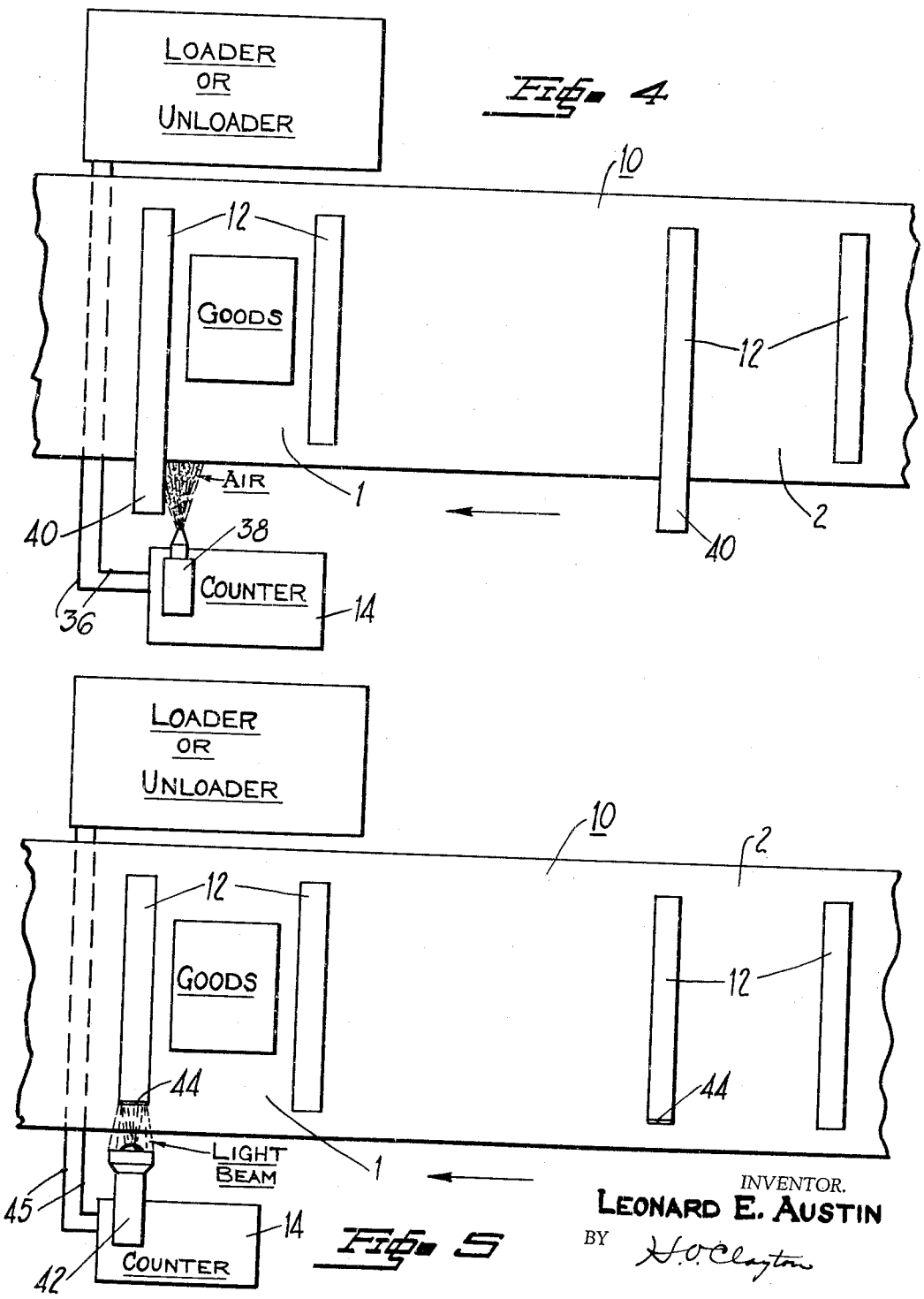

United States Patent Office 3,055,481
Patented Sept. 25, 1962

3,055,481
CONVEYOR MECHANISM
Leonard Edmond Austin, South Bend, Ind., assignor to the Bendix Corporation, a corporation of Delaware
Filed Dec. 30, 1957, Ser. No. 705,951
2 Claims. (Cl. 198—40)

This invention relates in general to means for selectively loading and unloading powered conveyors and in particular to a means of this type for transporting a plurality of different units, such as several types of automobile brakes, from one part of a manufacturing plant to another part of said plant, there to be disposed of as desired.

There is a need in this art for an automatically operated mechanism operable to load a conveyor with a plurality of types of products said products being then conveyed to unloader mechanism which selects and deposits the product at a desired station. The mechanism described in this specification, and of which my invention is a part, meets this need; for with said mechanism a plurality of types of brakes or other units, there being a plurality of units of each of said types, are selectively loaded on a conveyor, and then transported to another place, there to be selectively unloaded and deposited at the desired stations.

Another feature of the mechanism disclosed herein lies in the provision of a plurality of loader mechanisms together with corresponding unloader mechanisms said mechanisms being cooperable with a single conveyor system, said system comprising an endless conveyor carrying a plurality of conveyor units.

Yet another feature of the mechanism disclosed herein, and of which my invention constitutes a part, lies in the provision of a mechanism for sequentially loading a plurality of different units upon a conveyor mechanism, said operation being effected in a certain area or areas of a manufacturing plant, then conveying said units to the same or other areas of said plant and there, in a certain sequence, unloading the units.

My invention constitutes part of a loader, conveyor, unloader mechanism including a conveyor mechanism comprising a number of conveyor units said number being a multiple of a certain number, said conveyor mechanism cooperating with one or more loader units and a corresponding number of unloader units.

Now in the above described conveyor, loader, unloader goods handling mechanism, it is necessary, in order to effect the desired sequential loading and unloading operations, to include, as part of each of the loaders and unloaders, a so-called counter which in large part controls the operation of the mechanism. These counters, in my invention, cooperate with portions of the conveyor mechanism in activating the loaders and unloaders to effect this sequential operation of the mechanism. It is accordingly the principal object of my invention to provide an efficient and effective counter mechanism usable with both the loaders and unloaders and operative, in cooperation with the particular structure of the conveyor units of the conveyor mechanism, to effect the desired sequential operation of the loaders and unloaders. Preferably, and as an important feature of my invention, the principal element of each counter mechanism, e.g. a switch operating mechanism, a probe unit of a proximity pickup mechanism, the light emitting unit of an electric eye unit, or an air emitting blower unit, lies in a plane parallel or substantially parallel to the plane of an endless belt of the conveyor mechanism, portions of said belt constituting the principal part of the conveyor units. In the mechanism of my invention the conveyor units, supporting the goods being transported, are constructed to activate the aforementioned principal element of the counter mechanism as the conveyor units pass by the loaders and unloaders.

Other objects of the invention and desirable details of construction of parts will become apparent from the following detailed description of certain illustrative embodiments of the invention, taken in conjunction with the accompanying drawings illustrating said embodiments, in which:

FIGURE 1 is a view disclosing, in a diagrammatic manner, a loader, conveyor, unloader mechanism of which the counter mechanism of my invention is an important part;

FIGURE 2 is a plan view of one embodiment of the counter mechanism constituting my invention;

FIGURE 3 is a plan view of another embodiment of my invention that is the proximity probe controlled counter mechanism;

FIGURE 4 is a plan view of the air blower controlled counter mechanism of my invention; and FIGURE 5 is a plan view of the electric eye controlled counter mechanism of my invention.

There is diagrammatically disclosed in FIGURE 1 a loader, unloader and conveyor mechanism of which the counter mechanism constituting my invention is a part. The conveyor mechanism preferably includes a power driven endless elliptically shaped belt 10 having spaced apart pairs of cleats 12, FIGURES 2 to 5 inclusive. Each pair of cleats, together with the portion of the belt therebetween, defines a conveyor unit the number of said units preferably being a multiple of a certain number, say three, all as is disclosed in Austin et al. U.S. Patent Office application No. 491,738, filed March 2, 1955. The conveyor units are, in FIGURE 1, numbered 1, 2 and 3 and are bracketed in groups of threes. Each of the number one conveyor units is adapted to transport one type of product say a Ford brake unit; the number two conveyor units transport say a Chevrolet brake unit; and the conveyor units numbered three in FIGURE 1 transport Plymouth brakes.

FIGURE 1 also diagrammatically discloses the fixedly mounted loaders and unloaders of the system the loaders being indicated by the capital letters A, B and C and the unloaders by the capital letters A', B' and C'. The loader A handles say the aforementioned Ford brake unit, the loader B the Chevrolet brake unit, and the loader C the Plymouth brake unit. The unloaders A', B' and C' may handle, respectively, these same brake units.

Each of the loaders and unloaders of the mechanism of FIGURE 1 is controlled by a fixedly mounted counter unit 14 positioned opposite each loader and unloader, all of said units being of the same construction. The controls of these counter units 14 cooperate with portions of the aforementioned goods carrying conveyor units; and by virtue of the initial setting of the counter units 14 there is effected an operation of the mechanism to position the several types of brake units onto the conveyor units in a certain sequence.

The fact that the number of conveyor units is a multiple of the number 3 insures a loading of the Ford brake on the number 1 conveyor units, a loading of the Chevrolet brake on the number 2 conveyor units, and a loading of the Plymouth brake on the number 3 units; and with this mechanism there is also insured the corresponding unloading operations. The six counters 14 of FIGURE 1 may be set to effect either of two different sequences of operation of the loaders and either of two different sequences of operation of the unloaders. The sequence of operation of the loaders of FIGURE 1 may be different from the sequence of operation of the unloaders of this figure. It is also to be noted that another number of different types of products may be processed, say 4. To effect this operation of the mechanism the counters will be properly set, the loaders and unloaders will number 4 each, and the number of conveyor units will be a multiple of the number 4.

Describing now my invention the same lies in the controls for the counter 14 there being 4 different embodiments of said controls disclosed herein. In all of the embodiments the principle part thereof lies in a plane parallel or substantially parallel to the plane of the belt 10 thereby making for a more compact, effective and efficient mechanism.

Referring to FIGURE 2, diagrammatically disclosing the preferred embodiment of my invention, a switch 16 is fixedly mounted on the casing of the counter 14 said switch being closed by the outward movement of a spring loaded pin 18 having a roller member 20 mounted on its outer end. The switch 16 is closed by the operation of a spring, not shown, said spring biasing the pin 18 to its outward switch closing position. The belt is provided with a flange portion 22 and said belt is, in that portion thereof going to make up the goods handling conveyor units 1, 2 and 3, notched at 24. When the belt, moving in the direction indicated by the arrow in FIGURE 2, has moved to a position to register with the switch 16 then the roller 20 enters the notch 24 to close said switch; and this operation results in an immediate operation of the counter unit 14 to index the same; and every third indexing operation results in initiating an operation of the controlled unit that is the loader or unloader as the case may be. The roller 20 is at all times in contact with the flange 22; accordingly the pin 18 and the roller lie in a plane parallel or substantially parallel to the plane of the belt portion of the conveyor units. The counter 14 is wired, by wires 24, to the controlled unit disclosed in FIGURE 2. The counter, the loader, and the unloader of the mechanism disclosed herein may be of any suitable construction serving, respectively, to time the operation of the loaders and unloaders, load the goods onto the conveyor units, and unload said goods from said units; my invention lies in the controls for the counter unit 14.

There is diagrammatically disclosed in FIGURE 3 a so-called proximity pickup mechanism of any well known design; and this mechanism includes the counter 14. In this mechanism an electro proximity probe unit 26 is fixedly mounted on a fixedly mounted signal amplifying or pickup unit 28 the longitudinal axis of the unit 26 lying in a plane parallel or substantially parallel to the plane of the conveyor units 1, 2 and 3 and extending normal to the longitudinal axis of the belt 10. The unit 26 is electrically connected to the unit 28 and, by wires 30, to the electro-mechanical counter unit 14; and the latter unit is electrically connected to the loader unit by wires 32, all as is disclosed in FIGURE 3. A patch of suitably housed magnetic powder 34 is secured to the underside of each of the conveyor units 1, 2 and 3 said patches of powder cooperating with the probe unit 26 in a manner described hereinafter.

Describing the operation of the mechanism of FIGURE 3 as the conveyor units move in the direction of the arrow the patches of powder 34 operate, as said units pass by in proximity with the probe unit 26, to activate the counter 14 to index the same; and every third indexing operation results in an operation of the controlled unit whether it be a loader or unloader.

Another embodiment of my invention is disclosed in FIGURE 4 wherein the counter 14, wired to say a loader by wires 36, is activated by momentarily impeding the flow of air from a blower 38. This blower and its electro-mechanical control connection with the counter 14 are well known to those skilled in the art covering such a control accordingly the parts thereof are not disclosed herein; suffice it to say that when the conveyor units 1, 2 and 3 are moving in the direction of the arrow in FIGURE 3 a projection 40 on one of the cleats 12 of each conveyor unit serves, by passing through the stream of air emitted from the blower, to activate the counter to index the same; and every third indexing operation results in an operation of the controlled unit whether it be a loader or an unloader. It is to be noted that as with the previously described embodiments of my invention the principal part of the controls of FIGURE 4, that is the blower, lies in a plane parallel or substantially parallel with the plane of the conveyor units.

In FIGURE 5 there is disclosed the fourth of the embodiments of my invention disclosed herein. In this embodiment an electric eye control unit 42 is operably connected to the counter 14 which is wired, by wires 45, to the unit controlled, that is either a loader or an unloader. The longitudinal axis of the casing of the unit 42 lies in a plane parallel or substantially parallel to the plane of the conveyor units. As to the operation of this control as the conveyor units move past the counters the beam of light emitted from the unit 42 is reflected by an end portion 44 of one of the cleats 12 of each conveyor unit; and this serves to energize the unit 42 which in turn activates the counter to index the same; and every third indexing operation results in an operation of the controlled unit whether it be a loader or an unloader.

There is thus provided, in each of the four embodiments of my invention disclosed in the drawings, a simple, compact and effective control means for activating the loaders and unloaders of the mechanism disclosed.

I claim:
1. A goods handling mechanism constituting part of power operated means for loading, conveying and then unloading goods to be transported from one place to another, said mechanism comprising a power driven endless belt spaced apart portions thereof constituting conveyor units for the goods to be processed, a plurality of spaced apart cleats outlining portions of each conveyor unit, units for handling the goods being processed said units being mounted alongside the belt, and means for controlling the operation of said handling units including fixedly mounted counter mechanisms operable to time the operation of the handling units in the operation of the goods handling mechanism, said counter mechanisms each including air blowing units fixedly mounted on casing members of said counter mechanisms said units being mounted adjacent to said belt and operative in a plane parallel or substantially parallel to the plane of the belt and operative to energize the counter mechanisms by virtue of the interruption of a stream of air emitted from each blower unit said interruption being effected by an end portion of one of the cleats of each conveyor unit as the belt is moved past the handling units.

2. A goods handling mechanism constituting part of power operated means for loading, conveying and then unloading goods to be transported from one place to another, said mechanism comprising a power driven endless belt spaced apart portions thereof constituting the principal portions of conveyor units for the goods being processed, a plurality of spaced apart cleats outlining portions of each conveyor unit, units for handling the goods being processed said units being mounted alongside the belt, and means for controlling the operation of said handling units including fixedly mounted counter mechanisms operable to time the operation of the handling units in the operation of the goods handling mechanism and including light emitting units fixedly mounted on casing members of the counter mechanisms, said units being mounted adjacent to said cleats and operative in planes parallel or substantially parallel to the plane of the belt and operative to energize the counter mechanisms by virtue of the interruption of a beam of light emitted from each light emitting unit, said interruption being effected by an end portion of one of the cleats of each conveyor unit as the belt is moved past the handling units.

References Cited in the file of this patent

UNITED STATES PATENTS

| | | |
|---|---|---|
| 1,140,807 | Englar | May 25, 1915 |
| 2,483,717 | Zacek | Oct. 4, 1949 |
| 2,566,868 | Allia | Sept. 4, 1951 |
| 2,849,101 | Austin et al. | Aug. 26, 1958 |

FOREIGN PATENTS

| | | |
|---|---|---|
| 818,058 | France | Sept. 17, 1937 |